Patented July 16, 1940

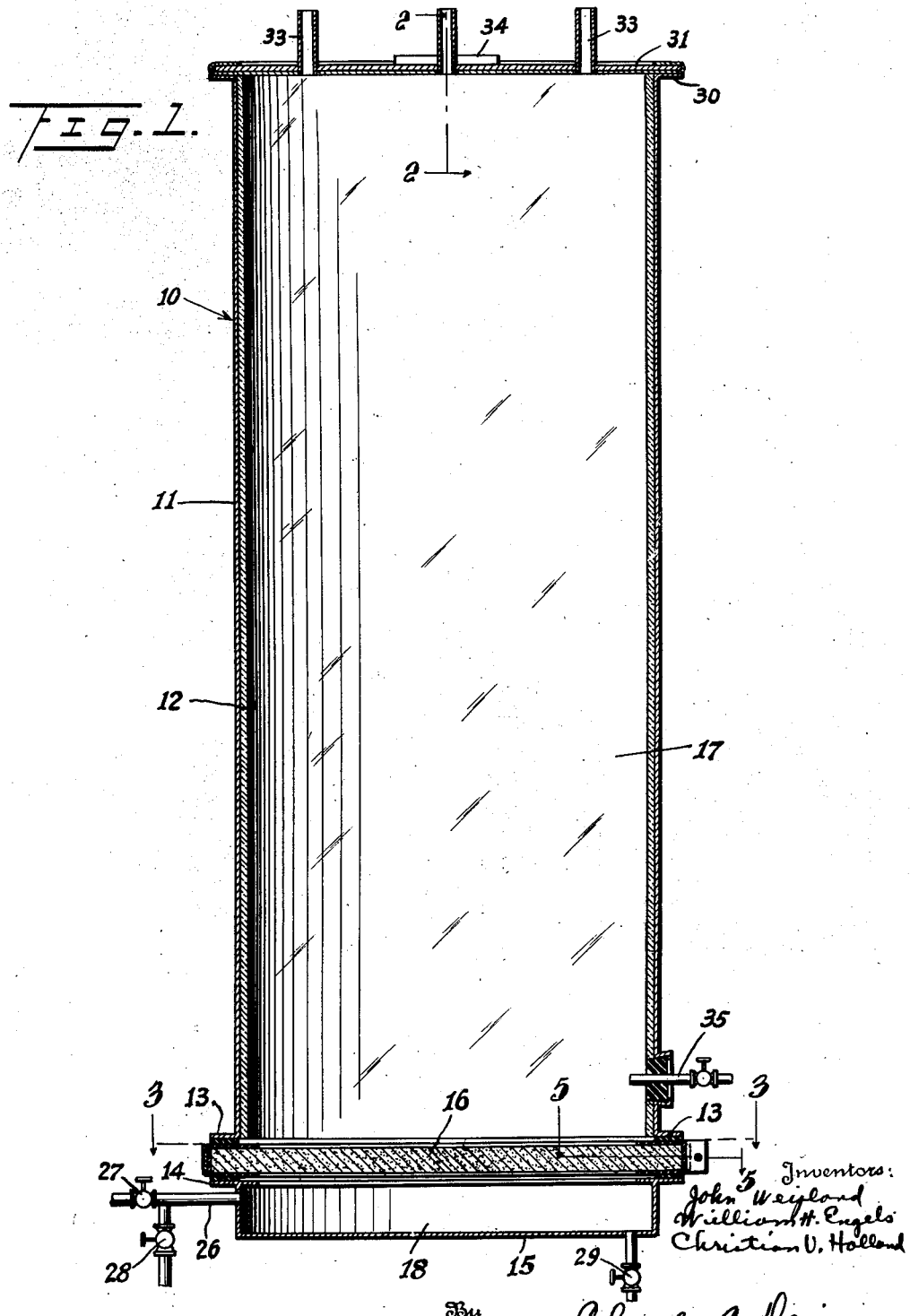

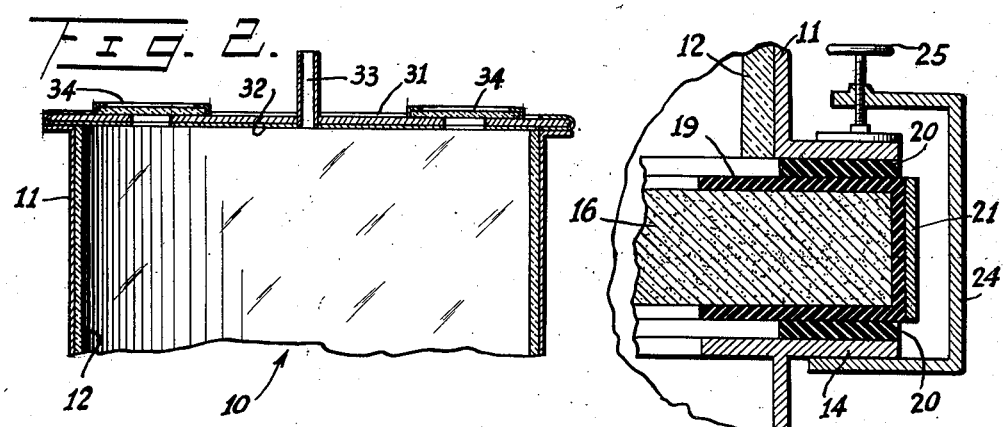
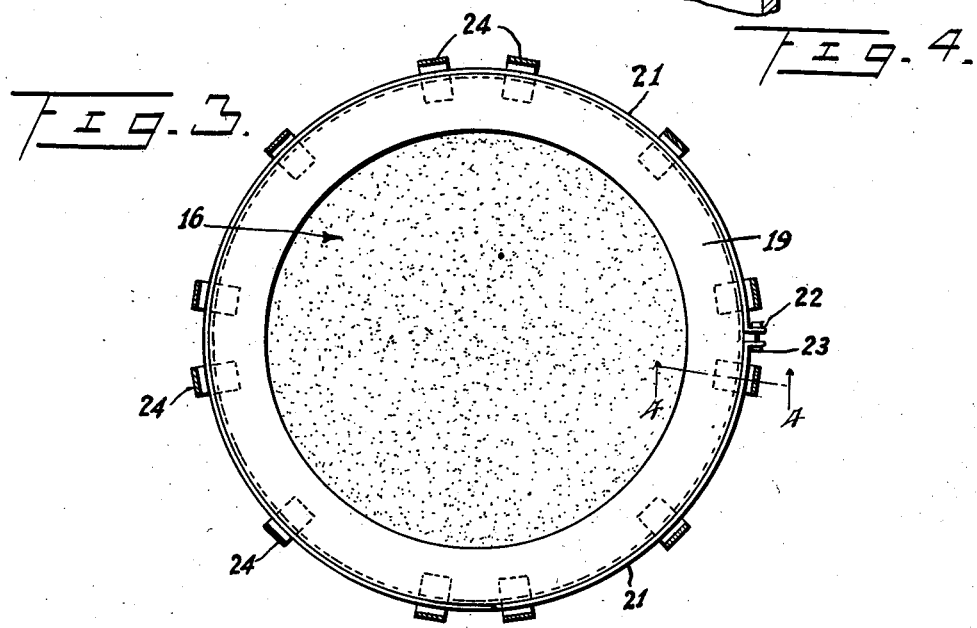
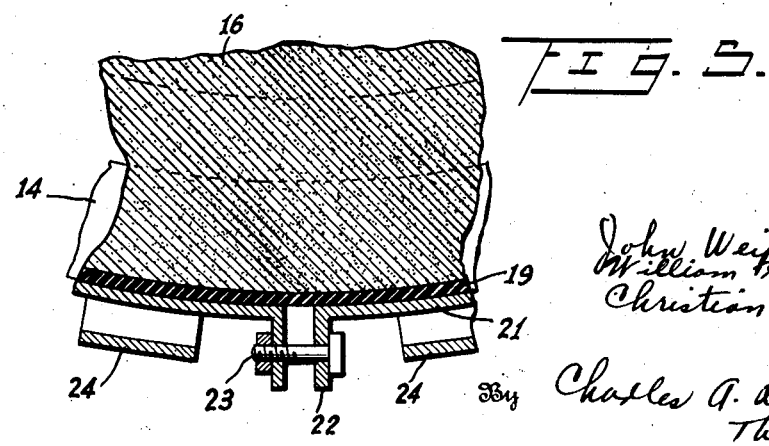

2,207,768

UNITED STATES PATENT OFFICE 2,207,768

FERMENTATIVE PROCESS FOR THE PRODUCTION OF SORBOSE

John Weijlard and William H. Engels, Rahway, and Christian V. Holland, Westfield, N. J., assignors to Merck & Co. Inc., Rahway, N. J., a corporation of New Jersey Application November 5, 1936, Serial No. 109,302

3 Claims. (Cl. 195—49)

This invention relates to a process for the production of sorbose.

The primary object of the invention is the production or manufacture of sorbose from a crystalline hexahydric alcohol known as sorbitol. According to our invention, the sorbitol in aqueous solution is subjected to bacterial oxidation with *Acetobacter suboxydans*, killed yeast being used as nutritive media, air under pressure being then forced through the foregoing solution, to effect the conversion of the sorbitol into sorbose.

The new process for the manufacture of sorbose further includes the steps of filtering the finished solution and concentrating the same in vacuo to produce a syrup which crystallizes in a water-alcohol mixture. This results in a yield of as high as 80 to 85 percent of sorbose.

Other objects of the invention will appear in the following description of the process which may be carried out in an apparatus such as that shown in the accompanying drawings, wherein Figure 1 is a vertical sectional view of an apparatus for the production of sorbose and disclosing a cylindrical chamber divided by a porous plate into an upper liquid chamber and a lower air chamber, Figure 2 is a detailed sectional view taken on line 2—2 of Figure 1, showing sight glasses in the cover wall of the receptacle, Figure 3 is a cross-sectional view taken on line 3—3 of Figure 1, Figure 4 is a detailed sectional view taken on line 4—4 of Figure 3, showing the liquid and air-tight connection between the upper and lower chambers of the receptacle and the porous partition plate forming the chambers, and Figure 5 is a detailed sectional view taken on line 5—5 of Figure 1.

The apparatus for the practice of our improved process for manufacturing sorbose according to our invention, may be of any preferred construction, an example thereof as illustrated comprising a cylindrical receptacle 10 including a metallic cylinder 11 with a vitreous or glass cylindrical lining 12. The lower end of the cylinder 11 carries an outwardly directed angular flange 13 which mates with outwardly directed angular flange 14 carried by the upper edge of a base receptacle 15.

As shown more clearly in Figures 1 and 4, a porous plate or disk 16 is positioned between the mating flanges 13 and 14 to provide a chamber 17 in the cylinder 11 that is separated from the chamber 18 in the base receptacle 15. An elastic or rubber ring 19 of U shape in cross section incloses the marginal edge of the porous disk 16 and rubber ring gaskets 20 are respectively positioned between the rubber ring 19 and the flanges 13 and 14. A split metallic band 21 surrounds the porous disk 16 to retain the rubber ring 19 in position, the ends 22 of split band 21 being secured together by the nut and bolt combination 23. C-shaped clamps 24 carrying adjusting screws 25 are clampingly engaged with the flanges 13 and 14 of the metallic cylinder 11 and the base receptacle 15 to provide a liquid and air-tight connection between the cylinder and base receptacle as will be evident from an inspection of Figure 4.

A pipe 26 is in communication with the chamber 18 in the base receptacle 15, the pipe 26 having a valve controlled pipe 27 in communication therewith to control the flow of filtered air into the chamber 18 while said pipe 26 has also a valve controlled pipe 28 communicating therewith for the delivery of steam to the chamber 18. The valve controlled drain pipe 29 extends from the bottom wall of the base receptacle 15.

As shown more clearly in Figures 1 and 2, the upper end of the metallic cylinder 11 is outwardly flanged as at 30 for the support of a cover that comprises a steel disk 31 having the bottom face thereof covered by block tin 32, the cover 31 having a series of upstanding pipes or tubes 33 to facilitate introduction of the sorbitol-yeast solution and also the introduction of the inoculating suspension of *Acetobacter suboxydans*, as well as providing for the normal escape of air. Sight glasses 34 are also carried by the cover 31 so that the reaction process may be inspected.

A valved sampling pipe 35 projects from the cylinder 11 adjacent the lower end thereof and above the porous plate 16.

In practicing our process with the apparatus disclosed, then, the entire cylinder is sterilized with steam through pipe 28, the sterile solution is placed in chamber 17, and filtered air is delivered to chamber 18, whereupon the culture of *Acetobacter suboxydans* is added. As an example, the sterile solution delivered to chamber 17 may have the following composition: 25 kg. or sorbitol, 2.5 kg. of yeast, and 250 liters of water. The porosity of the plate 16 is such that when air under pressure of approximately 10 to 12 cm. of mercury enters the chamber 18 in the base receptacle 15, the air will be forced through the porous plate 16 and upwardly through the 100 cm. column of liquid in the chamber 17, the air being evenly distributed throughout the liquid in the form of minute bubbles, thereby providing intimate contact in order to effect the conversion.

In approximately six days, the conversion is about 70% complete. The liquid is then filtered, concentrated in vacuo to a syrup and finally crystallized in a water-alcohol mixture. A yield of 60 to 65% sorbose is thus obtained.

In another example of the process, 20% of sorbitol may be used with respect to a given quantity of yeast-water and the time required to effect conversion to about 70% of theory is approximately 12 days.

From the above description of the process, it is believed that the production of sorbose from a sorbitol material will be readily apparent. The steps of the process comprise preparing a solution of sorbitol in baker's yeast-water, sterilizing, inoculating with *Acetobacter suboxydans*, and causing filtered air to percolate upwardly under pressure through a porous plate into the liquid in an upper chamber in the receptacle, producing minute bubbles with subsequent oxidation of the sorbitol in the solution, and thereafter filtering, concentrating and producing sorbose in crystallized form.

The process described herein for affecting the desired conversion described herein is distinguished from processes of the prior art in that a relatively high percentage of sorbotol may be employed. Thus, commercially applicable concentrations of as high as 20% sorbitol have been employed satisfactorily, whereas in the processes hitherto employed, only concentrations of sorbitol up to about 3% have been used.

We claim as our invention:

1. The process for producing sorbose which comprises forcing air through a solution consisting of more than 3% and up to 20% of sorbitol in yeast water inoculated with *Acetobacter suboxydans*, filtering and concentrating the liquid in vacuo, and then crystallizing the concentrated liquid in a water-alcohol mixture.

2. The process for producing sorbose which comprises preparing a solution consisting of 25 kg. of sorbitol and 2.5 kg. of yeast in 250 liters of water inoculated with *Acetobacter suboxydans*, forcing air through the solution to effect the reaction in the presence of the bacteria, filtering, concentrating, and crystallizing the syrup in a water-alcohol mixture.

3. In a process for producing sorbose from sorbitol, the step which comprises forcing air under pressure through a solution consisting of from 3 to 20% sorbitol in yeast water inoculated with *Acetobacter suboxydans*.

JOHN WEIJLARD.
WILLIAM H. ENGELS.
CHRISTIAN V. HOLLAND.